(No Model.) 2 Sheets—Sheet 1.
W. F. MARKS.
VARIABLE FEED DEVICE FOR GRAIN DRILLS.
No. 277,306. Patented May 8, 1883.
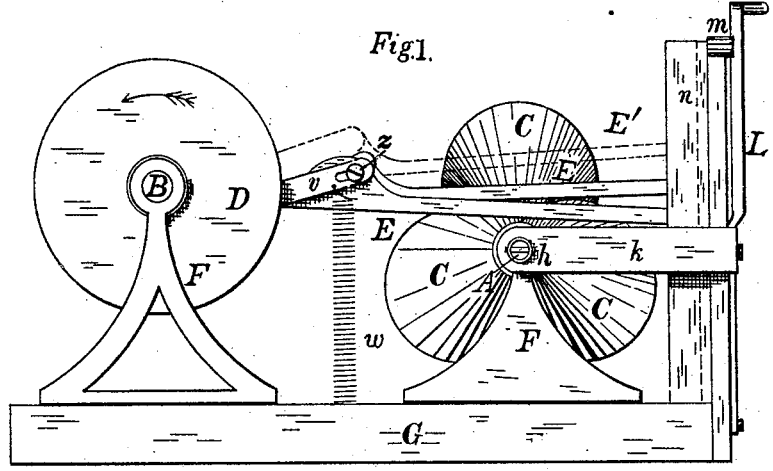
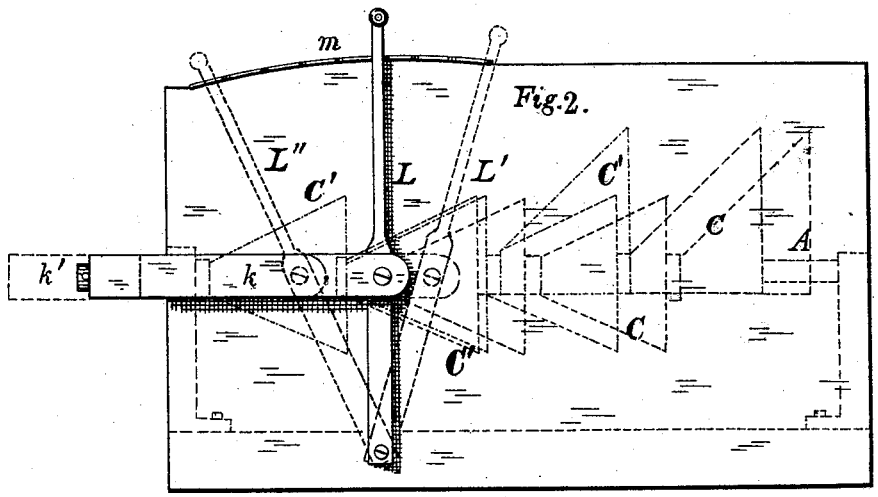
WITNESSES=
Chas. H. Caldwell
H. G. Phillips.
INVENTOR=
Walter F. Marks,
by Geo. B. Selden,
Atty.

(No Model.) 2 Sheets—Sheet 2.
W. F. MARKS.
VARIABLE FEED DEVICE FOR GRAIN DRILLS.
No. 277,306. Patented May 8, 1883.
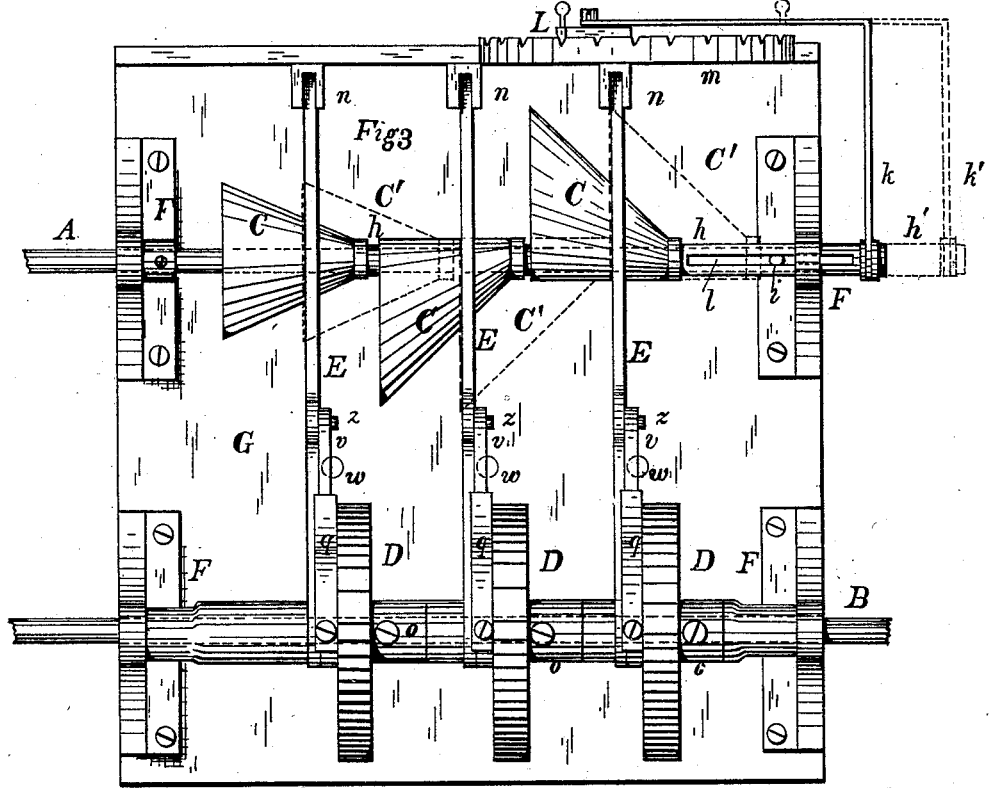
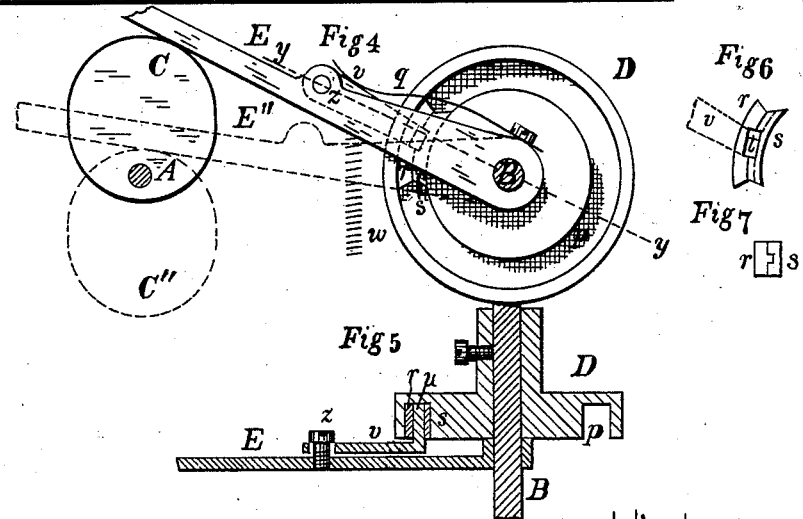
Witnesses =
Chas. H. Caldwell
H. G. Phillips.
Inventor =
Walter F. Marks,
by Geo. B. Selden,
atty.

UNITED STATES PATENT OFFICE.

WALTER F. MARKS, OF CHAPINVILLE, NEW YORK.

VARIABLE-FEED DEVICE FOR GRAIN-DRILLS.

SPECIFICATION forming part of Letters Patent No. 277,306, dated May 8, 1883.

Application filed January 15, 1883. (No model.)

*To all whom it may concern:*

Be it known that I, WALTER F. MARKS, of Chapinville, Ontario county, New York, have invented an Improved Variable-Speed Device for Grain-Drills or other Similar Machines, of which the following is a specification, reference being had to the annexed drawings.

My invention relates to an improved variable-speed device designed more particularly for use in connection with grain-drills or other similar machines, but capable of being used for many other purposes; and it consists, essentially, in the combination, with two shafts, of a series of laterally-adjustable conical eccentrics mounted on the driving-shaft and arranged to transmit motion with variable velocity to the other shaft by means of a series of levers and clutches.

My invention also consists in certain details of the apparatus, all as hereinafter more fully pointed out and specified.

My improved variable-speed device is represented in the accompanying drawings, in which Figure 1 is an end elevation. Fig. 2 is a side elevation. Fig. 3 is a plan view. Fig. 4 represents one of the clutch-disks detached. Fig. 5 is a section on the line $y\,y$, Fig. 4. Fig. 6 is a side view of the clutch-blocks. Fig. 7 is an end view of the same.

My improved variable-speed device consists, essentially, of two parallel shafts supported in suitable journals, and arranged to transmit motion at a variable speed from one to the other by means of a number of sliding conical eccentrics on the driver, and a corresponding number of levers, clutches, and clutch-disks on the driven shaft.

In the accompanying drawings, A represents the driving and B the driven shaft. C C C are a number of conical eccentrics fastened to a sleeve which slides lengthwise of the driving-shaft A. D D D are clutch-disks secured to the driven shaft B. E E E are the clutch-levers, and L is a lever or other suitable device for shifting the conical eccentrics lengthwise on the shaft A and holding them in any desired position.

The shafts A and B are supported parallel to each other in journals F F F F, attached to a suitable base, G, which may be any convenient part of the machine to which it is desired to attach my improved variable-speed device.

The conical eccentrics consist of cones or bodies of conoidal form secured to the sliding sleeve $h$ in such position that while the apex of the cone revolves true with the sleeve the base is eccentric thereto, as shown in the drawings. The conical eccentrics are placed on the shaft A at an angle with each other corresponding to the number employed. The cones may be all cast in one piece with the sleeve; or they may be formed separately and attached thereto in any suitable manner. The cones may be made hollow for the purpose of reducing their weight. The sleeve $h$ slides freely through the bearing F at the end of the shaft A, being compelled to rotate with the shaft by the pin $i$, inserted through the slot $l$ in the sleeve, or by any other suitable device for accomplishing this purpose. At its outer end the sleeve $h$ is attached to a shifting mechanism, by which provision is made for moving the sleeves and cones lengthwise of the shaft A, and for securing them in any desired position. This shifting mechanism may be varied to suit the arrangement or construction of the machine to which my variable-speed motion is applied; but it will consist, essentially, of a handle or lever, a notched segment, and a connection between the lever and the sleeve. In the drawings I have represented it as consisting of a bent connection, $k$, a notched segment, $m$, and a lever, L. The end of the sleeve $h$ is secured to the connection $k$, so that it may revolve freely therein, and the lever L is pivoted to the connection. By moving the lever from one notch in the segment $m$ to another the cones C C C will be shifted endwise on the shaft, as represented by the dotted lines C' C' C', Fig. 3. The lever L is shown as arranged to spring into the notches in the segment; but any preferred form of catch or dog may be used. The motion of the lever, connection, and shaft is indicated by the dotted lines L' L'' $k'$ $h'$ in the figures.

The conical eccentrics may be attached directly to the shaft A, which is itself arranged so as to slide lengthwise through its journal-boxes, and connected with the shifting device, thereby dispensing with the sleeve $h$.

The levers E are arranged to swing freely about the driven shaft B, their free ends resting on the surfaces of the conical eccentrics C, and being provided with suitable guides, n, for their extremities, if preferred.

The clutch-disks D are rigidly secured to the shaft B in any convenient manner, suitable collars, o o o, Fig. 3, if necessary, being placed on the shaft to prevent end-play. The disks D are provided on one side with circular grooves p, Figs. 4 and 5, into which the clutch-blocks r and s are fitted. The clutch-blocks may be provided with a tongue and groove on their opposing surfaces, as represented in Fig. 7. An opening, t, Fig. 6, is made in the clutch-blocks, in which is inserted the bent end u, Fig. 5, of the arm v, the outer end of which is attached to a screw or pin, z, inserted into the lever E through a slot in the arm.

In operation the rising of the lever E causes the bent end u of the arm v to spread the clutch-block slightly, thereby causing friction between the sides of the clutch-blocks and the groove p, so that the motion of the lever E is transmitted to the clutch D. As the lever E falls to E″, Fig. 4, in consequence of the continued motion of the conical eccentric, the clutch-blocks travel in the groove p without transmitting motion to the clutch D.

The levers E may be made heavy or provided with a weight, so as to fall by gravity; or the springs w w may be used to give them their return movement.

In order to insure the proper action of the arms v, the springs q may be employed; but the springs w may be attached directly to the arms v, in which case the springs q will be unnecessary.

Any preferred number of conical eccentrics, levers, and clutches may be employed.

A motion which is practically continuous for most purposes is secured by the use of three conical eccentrics; but for special purposes four or more may be placed on the driving-shaft and arranged to operate a corresponding number of levers and clutches.

A friction-roller may be attached to the levers E where they bear on the conical eccentrics.

The shaft B may be made square, the lever E being arranged to play on a circular hub on the side of the clutch D.

I do not intend to confine myself to the particular form of clutch mechanism shown, as any suitable clutch may be employed in my improved variable-speed device.

In the practical application of my invention to grain-drills, fertilizer-distributers, seeding-machines, &c., the shaft A would be connected either directly or by intermediate devices with the carrying or driving wheel, and the shaft B would be arranged to operate the feeding or distributing mechanism, to which it is desired to transmit motion at a variable speed.

My improvement in variable-speed devices is compact, cheap, and durable, and possesses greater simplicity than any previous device for accomplishing the same purpose.

I claim—

1. The combination of the shafts A and B with a series of laterally-adjustable conical eccentrics, C C C, and a corresponding series of clutch mechanisms on the driven shaft, arranged to transmit motion at a variable speed from one shaft to the other, substantially as and for the purposes set forth.

2. The combination of the shaft A with a series of laterally-adjustable conical eccentrics, C C C, substantially as and for the purposes set forth.

3. The combination of the shaft A with a series of conical eccentrics, C C C, attached to sleeve h, arranged to slide lengthwise on the shaft A while rotating therewith, substantially as and for the purposes set forth.

4. The combination of the shaft A, conical eccentrics C C C, sleeve h, arm k, lever L, and notched segment m, substantially as and for the purposes described.

5. The combination, with the laterally-adjustable conical eccentric C, of the lever E and clutch D, substantially as and for the purposes set forth.

6. The combination, with the shafts A and B, of a series of laterally-adjustable conical eccentrics, C C C, levers E E E, clutches D D D, and springs v v v, substantially as and for the purposes set forth.

7. The combination, with the shafts A and B, of a series of laterally-adjustable conical eccentrics, levers, and clutches, arranged to transmit motion at a variable speed from one shaft to the other, and mechanism for adjusting the eccentrics and securing them in any desired position, substantially as and for the purposes set forth.

WALTER F. MARKS.

Witnesses:
WALTER MARKS,
GEO. B. SELDEN.